United States Patent
Nachum

(10) Patent No.: US 9,178,820 B1
(45) Date of Patent: Nov. 3, 2015

(54) DELAYED AUTO NEW ADDRESS LEARNING

(71) Applicant: Marvell Israel (M.I.S.L) Ltd., Yokneam (IL)

(72) Inventor: Gai Nachum, Rishon Le Zion (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 106 days.

(21) Appl. No.: 14/161,935

(22) Filed: Jan. 23, 2014

Related U.S. Application Data

(60) Provisional application No. 61/758,382, filed on Jan. 30, 2013, provisional application No. 61/756,323, filed on Jan. 24, 2013.

(51) Int. Cl.
*H04L 12/28* (2006.01)
*H04L 12/741* (2013.01)
*H04L 12/757* (2013.01)

(52) U.S. Cl.
CPC ............ *H04L 45/745* (2013.01); *H04L 45/023* (2013.01)

(58) Field of Classification Search
CPC ..... H04L 45/00; H04L 45/021; H04L 45/023; H04L 45/08; H04L 45/60; H04L 45/72; H04L 45/745
See application file for complete search history.

(56) References Cited

U.S. PATENT DOCUMENTS

| | | | |
|---|---|---|---|
| 7,796,590 B1 | 9/2010 | Melman et al. | |
| 8,103,800 B2 * | 1/2012 | Tzeng et al. | 709/250 |
| 2005/0147111 A1 * | 7/2005 | Moleyar et al. | 370/412 |
| 2013/0195105 A1 * | 8/2013 | Basso et al. | 370/389 |
| 2013/0250965 A1 * | 9/2013 | Yakan | 370/401 |

* cited by examiner

*Primary Examiner* — Anh Ngoc Nguyen

(57) ABSTRACT

A network device includes a plurality of ports and at least one packet processor separate from a central processing unit (CPU). The packet processor is configured to forward a received packet based on a look-up of a destination address of the received packet in a table of learned entries that associate first addresses checked by the CPU to the ports of the network device, to add a new provisional entry that associates a source address with an ingress port of the received packet based on a look-up of the source address in both the learned entries and provisional entries that associate second addresses to be checked by the CPU to the ports of the network device, and to upgrade the new provisional entry to a learned entry with a delay time (e.g., a pre-determined time period) to allow the CPU to check the source address.

20 Claims, 3 Drawing Sheets

DELAYED AUTO NEW ADDRESS LEARNING

INCORPORATION BY REFERENCE

This present disclosure claims the benefit of U.S. Provisional Application No. 61/756,323, "Delayed Auto New Address Learning" filed on Jan. 24, 2013, and U.S. Provisional Application No. 61/758,382, "Delayed Auto New Address Learning" filed on Jan. 30, 2013, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, an Ethernet switching device makes decisions for packet forwarding based on a forwarding database. In an example, the forwarding database includes a table storing media access control (MAC) addresses in association with ports of the Ethernet switching device. When the Ethernet switching device receives a packet, the Ethernet switching device extracts a MAC address in a destination field of the packet, and performs a lookup to find a port associated with the MAC address in the table. Then, via the port, the packet is sent out of the Ethernet switching device.

SUMMARY

Aspects of the disclosure provide a network device that includes a plurality of ports and at least one packet processor separate from a central processing unit (CPU). The plurality of ports is configured to receive packets from a network and to transmit packets to the network. The packet processor is configured to forward a received packet based on a look-up of a destination address of the received packet in a table of learned entries that associate first addresses checked by the CPU to the ports of the network device, to add a new provisional entry that associates a source address with an ingress port of the received packet based on a look-up of the source address in both the learned entries and provisional entries that associate second addresses to be checked by the CPU to the ports of the network device, and to upgrade the new provisional entry to a learned entry with a delay time (e.g., a pre-determined time period) to allow the CPU to check the source address.

In an embodiment, the learned entries and the provisional entries are entries in a forwarding database.

According to an aspect of the disclosure, the packet processor is configured to broadcast the received packet when the look-up of the destination address in the learned entries fails to find a match. Further, the packet processor is configured to add the new provisional entry in the forwarding database when the look-up of the source address fails to find a match in the first addresses and the second addresses. In an example, the packet processor sends a notification of the source address to the CPU to let the CPU check the source address for security control. The CPU is configured to cause the provisional entry to be deleted from the forwarding database when the CPU determines that the source address is prevented from being included among the learned entries.

According to another aspect of the disclosure, the packet processor is configured to forward the received packet via an egress port associated with the destination address of the received packet, when the destination address corresponds to a learned entry.

In an embodiment, the packet processor is configured to add the new provisional entry that associates a media access control (MAC) address in a source field of the received packet in association with the ingress port of the received packet when the look-up of the MAC address fails to find a match in both the learned entries and the provisional entries. In an example, the packet processor is configured to broadcast to all ports except the ingress ports of received packets having the MAC address in a destination field of the packets before the new provisional entry is automatically converted to a learned entry. Further, once the new provisional entry is upgraded to a learned entry, the packet processor is configured to forward subsequently received packets having the MAC address in a destination field of the packets via the port associated with the MAC address in the learned entry.

Aspects of the disclosure provide a method for packet processing. The method includes receiving, by a packet processor separate from a central processing unit (CPU), a packet from a port among a plurality of ports, and forwarding the received packet based on a look-up of a destination address of the received packet in a table of learned entries that associate first addresses to the ports of the network device. The first addresses have been checked by the CPU. Further, the method includes adding a new provisional entry that associates a source address of the packet with the port based on a lookup of the source address in the first addresses of the learned entries and second addresses of provisional entries to be checked by the CPU, and upgrading the new provisional entry to a learned entry with a delay time to allow the CPU to check the source address.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
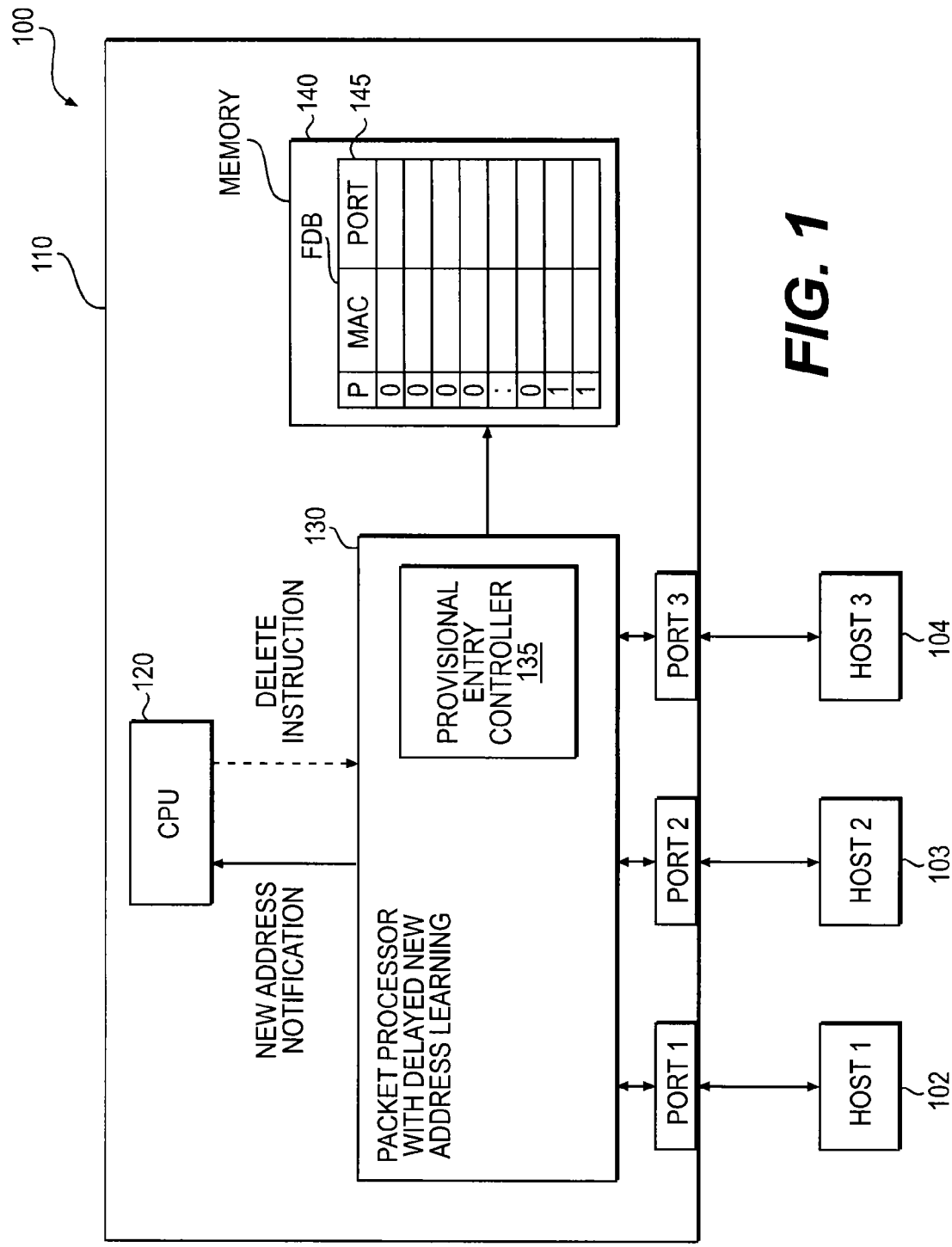
FIG. 1 shows a block diagram of a network example 100 according to an embodiment of the disclosure.

FIG. 1 shows a block diagram of a network example 100 according to an embodiment of the disclosure. In an example, the network 100 includes host devices, such as host devices 102-104, and the like, that form host nodes, and switch devices, such as a switch device 110, and the like, that form the switch nodes. The switch nodes and the host nodes are coupled together. It is noted that the network 100 includes other switch devices and host devices that are not shown. It is also noted that the host device 102-104 can be coupled directly to the switch device 110 or via other switch devices that are not shown.

According to an aspect of the disclosure, the switch device 110 is configured with a delayed auto new address learning feature to delay a time for a new address to be learned when the new address is received in a packet, in order to allow a central processing unit (CPU) to have time to prevent specific addresses from learning.

Specifically, in the FIG. 1 example, the switch device 110 includes a CPU 120, a packet processor 130 and a memory 140. These elements are coupled together as shown in FIG. 1.

The CPU 120 is configured to execute system codes and application codes to perform various system functions and application functions. In an example, the CPU 120 executes software codes for a network security application to determine whether an address, such as a media access control (MAC) address, and the like is safe to be learned and used for packet forwarding.

The packet processor 130 includes suitable circuits for packet processing. In an embodiment, the packet processor 130 is dedicated for packet processing, and is configured to process packets with accelerated speed, for example, in comparison to the CPU 120. In an example, the packet processor 130 is implemented using a processing pipeline architecture. The processing pipeline architecture includes multiple hardware processing stages or software driven processing stages coupled together into a pipeline, in an embodiment. Alternatively, the packet processor 130 is implemented as a multiplicity of run-to-completion processor elements, each of which is configured, in coordination with dedicated accelerators, to perform substantially all processing operations on an incoming packet. The circuits of the packet processor 130 are designed for dedicated packet processing, and can be implemented with fast packet processing speed and small silicon area footprint.

The memory 140 is configured to store software codes and various data. In the FIG. 1 example, the memory 140 stores a forwarding database 145 that associates MAC addresses with ports of the switch device 110. The forwarding database 145 is used for packet forwarding. In an example, when the destination of a packet is a MAC address in the forwarding database 145, the packet is forwarded to a port in association with the MAC address in the forwarding database 145.

In the FIG. 1 example, the forwarding database 145 includes a table of entries to store MAC addresses in association with ports. Each entry has a first field P, a second field MAC and a third field PORT. In an example, the first field stores a type indicator that indicates whether the entry is a learned entry or a provisional entry, the second field stores a MAC address, and the third field stores a port identifier for a port in the switch device 110 that is in association with the MAC address. In an example, when the type indicator is "0", the entry is a learned entry; when the type indicator is "1", the entry is a provisional entry. In an embodiment, the learned entries are used in packet forwarding, and the provisional entries are temporary entries that are not used in packet forwarding. A provisional entry can be turned into a learned entry by changing the type indicator in an example.

In the switch device 110, the CPU 120 is a programmably configurable processor configured to execute suitable software instructions to perform various functions, in an embodiment, and the packet processor 130 is a dedicated processor configured for packet processing, and is implemented with circuits for dedicated packet processing functions. When packet processing requires additional functions that are not implemented in the packet processor 130, the packet processor 130 sends a notification to the CPU 120 to let the CPU 120 perform the additional functions. The notification to the CPU 120 is in the form of an interrupt, in an embodiment, and it may take time for the CPU 120 to handle the interrupt.

According to an aspect of the disclosure, the packet processor 130 is configured to automatically learn MAC addresses from incoming packets, and apply learned MAC addresses to build the forwarding database 145. The CPU 120 is configured to provide security control of the learned addresses and prevent specific addresses from being learned. In an embodiment, when the packet processor 130 identifies a new address from an incoming packet, such as an address that is not in any entries of the forwarding database 145, the packet processor 130 performs a delayed auto learning of the new address to allow the CPU 120 to have time to prevent specific addresses from being learned.

Specifically, in an example, when packet processor 130 receives a packet that enters the switch device 110 from a port, the packet processor 130 determines whether a source address of the packet is a new address that does not exist in any of the entries of the forwarding database 145. In an embodiment, the packet processor 130 searches the forwarding database 145 to check whether the source address matches an address in one of the learned entries and the provisional entries. When the source address does not match any address in the learned entries and the provisional entries, the source address is deemed a new address.

When the source address is a new address, the packet processor 130 adds a provisional entry to the forwarding database 145. The provisional entry is a temporary entry that is not used in packet forwarding, and can be turned into a learned entry that is used in packet forwarding. In an example, the provisional entry has "1" in the first field P, has the source address in the second field MAC and has a port identifier of the ingress port for the packet in the third field PORT. In addition, the packet processor 130 sends a notification to the CPU 120 to notify the CPU 120 of the new address.

Further, for each incoming packet, the packet processor 130 processes the packet and forwards the packet. Specifically, the packet processor 130 determines whether a destination address in the packet has been previously learned. In an embodiment, the packet processor 130 searches the forwarding database 145 to check whether the destination address matches an address in one of the learned entries. When the destination address matches an address in a learned entry, the packet is sent out of the switch device 110 via a port in association with the destination address in the learned entry. When the destination address does not match any address in the learned entries, the packet is broadcasted out of the switch device 110, for example, via all the ports except the ingress port of the packet. In an example, the destination address does not match any address in the learned entries, but matches an address in a provisional entry, the packet is still broadcasted out of the switch device 110, for example, via all the ports except the ingress port of the packet.

When the CPU 120 receives an interrupt corresponding to the notification of the new address, it may take time for the CPU 120 to pause or finish its current task, handle other interrupts having higher priorities, and then handle the interrupt. In an example, the CPU 120 keeps a blacklist of MAC addresses that should be prevented from being learned, such as hostile MAC addresses that have been identified for conducting spoofing attacks, and the like. When the new address is in the blacklist, the CPU 120 causes the provisional entry with the new address to be deleted from the forwarding database 145. In an example, when the new address is within the blacklist, the CPU 120 sends a delete instruction for the new address to the packet processor 130.

In an embodiment, the provisional entry is upgraded to a learned entry after a pre-determined time period (a delay time) when the provisional entry survives without being deleted, for example when no delete instruction for the provisional entry from the CPU 120 has been received during the predetermined time period. In an example, the pre-determined time period is different from forwarding database aging time, and has a minimum value of a few seconds, such as five seconds, and the like. In the FIG. 1 example, the packet processor 130 includes a provisional entry controller 135. The provisional entry controller 135 is configured to track provisional time for the provisional entries, and upgrade a provisional entry to a learned entry when no delete instruction for the provisional entry from the CPU 120 has been received during the pre-determined time period. The pre-determined time period allows the CPU 120 to have time to determine whether the MAC address in the provisional entry is safe to be learned, and take actions, such as sending delete instruction, when the MAC address is not safe to be learned.

In an example, when a provisional entry is newly added in the forwarding database 145, the provisional entry controller 135 starts tracking the provisional time period for the provisional entry. For example, the provisional entry controller 135 includes a free-running timer. At the time the provisional entry is added, the value of the timer is taken. Then, the pre-determined time is added with the value to determine a target value of the timer when the provisional entry can be upgraded if the provisional entry survives without being deleted.

When the provisional entry controller 135 receives a delete instruction for the new address in the provisional entry from the CPU 120 before the timer reaches the target value, the provisional entry controller 135 causes the provisional entry to be deleted. When the provisional time of the provisional entry exceeds the pre-determined time period, for example, the timer exceeds the target value, and the provisional entry survives without being deleted, the provisional entry controller 135 causes the provisional entry to be upgraded to a learned entry, for example, changing the type indicator from "1" to "0".

According to an aspect of the disclosure, the switch device 110 has a reduced traffic between the packet processor 130 and the CPU 120. In an example, when a provisional entry with a new address exists in the forwarding database 145, the packet processor 130 does not send additional notifications for the new address when more packets with the new address in the source address field of the packets enter the switch device 110. In another example, when the CPU 120 determines that the new address is not in the blacklist to be prevented from learning, the CPU 120 does not need to send any instructions to the packet processor 130, the provisional entry is upgraded to the learned entry automatically after the pre-determined time period.

It is noted that the switch device 110 can suitably be modified. In an example, the CPU 120 has an interface to the memory 140, and directly sends the delete instruction to the memory 140 to cause a provisional entry with a prevented address to be deleted.

In another example, the forwarding database 145 is modified to include a third type of entries—blacklisted entries. For example, each entry in the forwarding database 145 includes a fourth field (not shown) for blacklist flagging. In an embodiment, when a delete instruction for a provisional entry is received, the provisional entry controller 135 causes the fourth field of the provisional entry to turn on the blacklist flag to identify that the MAC address in the entry has been blacklisted, and the entry is a blacklisted entry. In an embodiment, the blacklisted entry is used similarly to the provisional entry in the source address look-up and destination address look-up, but cannot be automatically upgraded to the learned entry.

Figure 2:
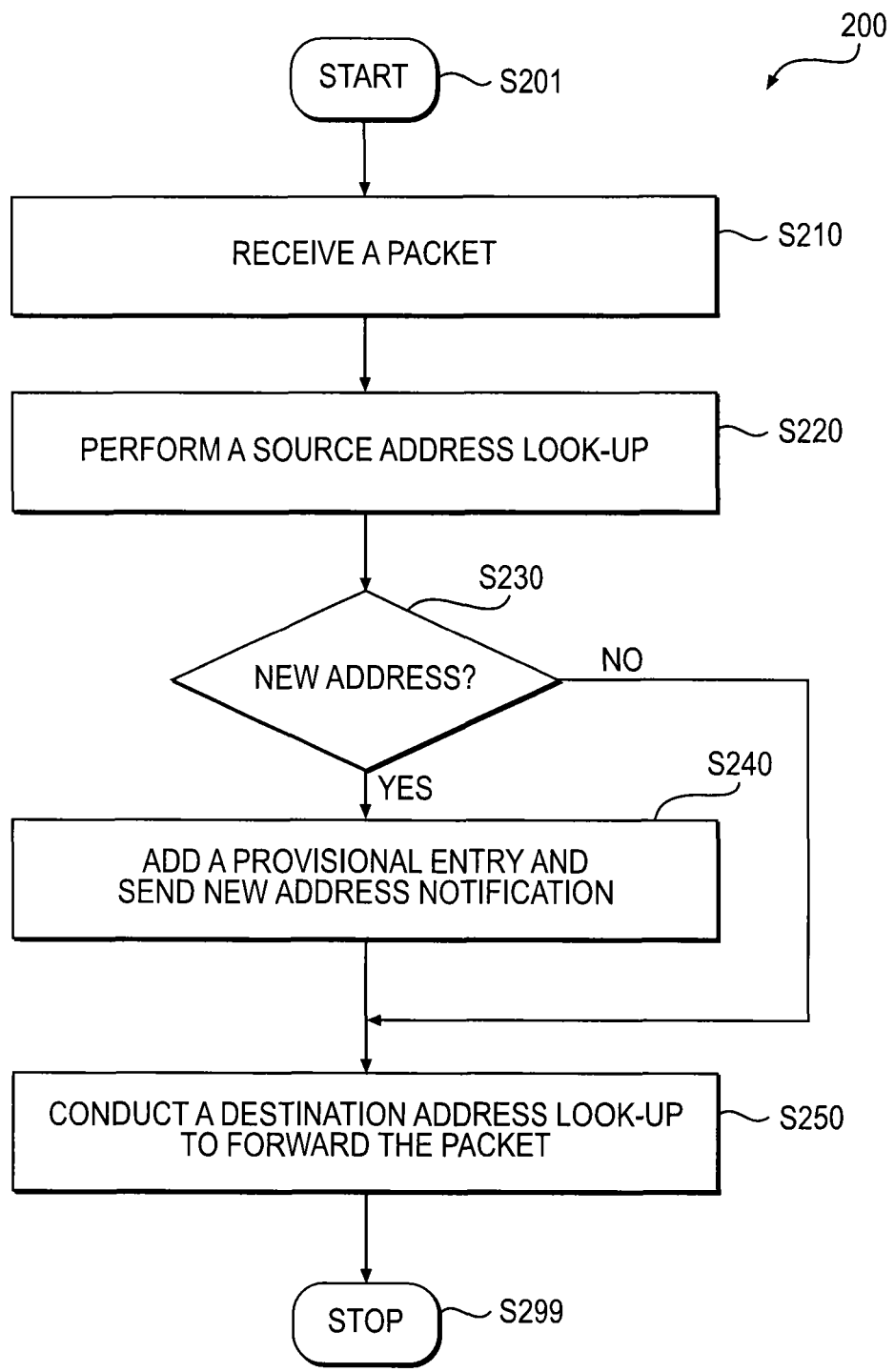
FIG. 2 shows a flow chart outlining a process example 200 for packet processing according to an embodiment of the disclosure.

FIG. 2 shows a flow chart outlining a process example 200 for packet processing according to an embodiment of the disclosure. In an example, the process is executed by a switch device, such as the switch device 110, for packet processing. The process starts at S201, and proceeds to S210.

At S210, the switch device receives a packet. The packet includes a source field identifying a source address of the packet and a destination field identifying a destination address of the packet. In an example, the switch device 110 receives a packet coming into the switch device 110 from port 2. In an example, the packet is originated from the host device 103, and the destination of the packet is the host device 104. In an example, the packet includes a source field and a destination field. The source field includes a source address that identifies the host device 103, such the MAC address of the host device 103, and the destination field includes a destination address that identifies the host device 104, such as the MAC address of the host device 104. In the FIG. 1 example, when the switch device 110 receives the packet, the packet processor 130 extracts the source address and the destination address.

At S220, a source address look-up is performed. In an embodiment, the provisional entries and the learned entries are used in the same manner in the source address look-up. In the FIG. 1 example, the packet processor 130 performs a lookup of the MAC address for the host device 103 in the learned entries and the provisional entries of the forwarding database 145.

At S230, the process proceeds differently based on whether or not the source address is a new address. In the FIG. 1 example, when the source address does not match any address in the learned entries and the provisional entries, the source address is deemed to be a new address. When the source address matches an address of an entry, either a learned entry or a provisional entry, the source address is not a new address. When the source address is a new address, the process proceeds to S240; otherwise, the process proceeds to S250.

At S240, a provisional entry is added into a forwarding database, and a new address notification is sent to a CPU. In the FIG. 1 example, the packet processor 130 causes a new provisional entry to be added in the forwarding database 145, and sends a notification with the new address to the CPU 120 for the CPU 120 to perform security control on the new address. The new provisional entry associates the MAC address for the host device 130 with port 2 where the packet enters the switch device 110 in the example, and the first field (P) of the new provisional entry is set to "1", for example, to indicate that the new entry is a provisional entry. In an embodiment, the provisional entry controller 135 records a value of a timer at the time the provisional entry is added and determines a projected value of the timer by when the provisional entry can be upgraded to a learned entry if the provisional entry survives without being deleted.

At S250, a destination address look-up is performed, and the packet is forwarded based on the result of the destination look-up. In an embodiment, the learned entries are used in the destination address look-up for packet forwarding, and the provisional entries are not used in the destination address look-up for packet forwarding. In the FIG. 1 example, the packet processor 130 performs a lookup of the MAC address for the host device 104 in the learned entries of the forwarding database 145. When the destination address matches an address of a learned entry in the forwarding database 145, the packet is output of the switch device 110 via a port in association with the address in the learned entry. When the destination address does not match any address of the learned entries in the forwarding database 145, the packet is broadcasted to all the ports except port 2 in an example. In an example, even if the destination address is in one of the provisional entry, because the provisional entries are not used in the destination address look-up for packet forwarding, the packet is still broadcasted to all the ports except port 2 for example. The process then proceeds to S299 and stops.

Figure 3:
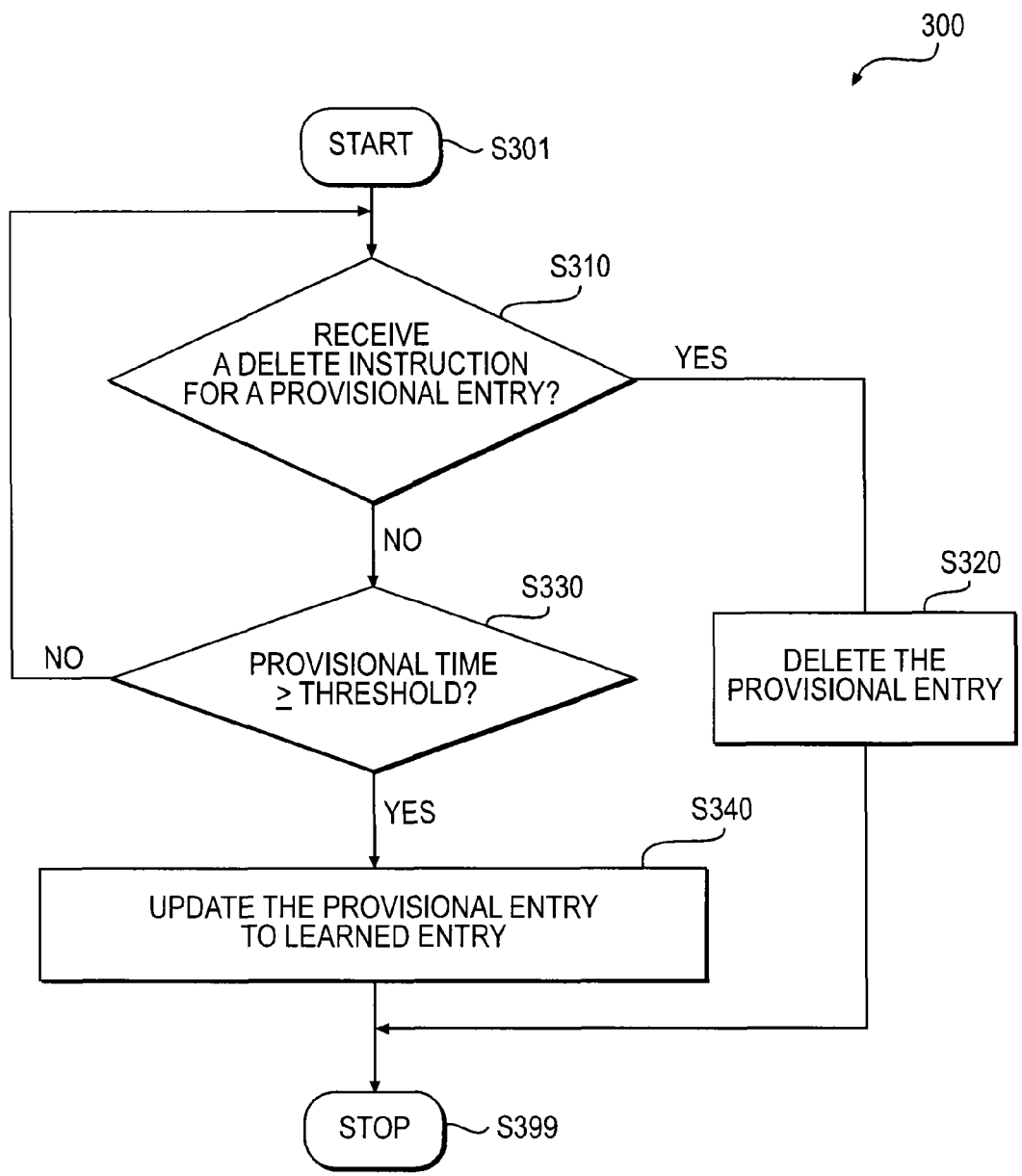
FIG. 3 shows a flow chart outlining a process example 300 for provisional entry management according to an embodiment of the disclosure.

FIG. 3 shows a flow chart outlining a process example 300 for provisional entry management according to an embodiment of the disclosure. In the FIG. 1 example, the process 300 is executed by the provisional entry controller 135 to operate on a provisional entry in the forwarding database 145. The provisional entry includes "1" in the first field to indicate the entry is a provisional entry. The provisional entry associates a MAC address with a port of the switch device 110. The process starts at S301, and proceeds to S310.

At S310, the process proceeds based on whether a delete instruction for the provisional entry is received. In the FIG. 1 example, at the time the provisional entry with the MAC address is added in the forwarding database 145, a provisional time for the provisional entry is tracked, and a notification (e.g., in the form of an interrupt) with the MAC address is sent from the packet processor 130 to the CPU 120. At a time when the CPU 120 is able to handle the interrupt, the CPU 120 determines whether the MAC address is safe to be added in the forwarding database 145, for example, based on a blacklist. When the CPU 120 determines that the MAC address is not safe, for example, when the MAC address is in the blacklist, the CPU 120 sends a delete instruction for the MAC address to the packet processor 130 to cause the provisional entry to be deleted; otherwise, the CPU 120 does not need to send any instructions. When the packet processor 130 receives the delete instruction for the MAC address, the process proceeds to S320; otherwise, the process proceeds to S330.

At S320, the provisional entry is deleted. In the FIG. 1 example, the provisional entry controller 135 causes the provisional entry with the MAC address to be deleted from the forwarding database 145. In another embodiment, instead of deleting entries with the blacklisted MAC addresses, the forwarding database 145 flags entries with the blacklisted MAC addresses. In an example, each entry in the forwarding database 145 includes a fourth field (not shown) for blacklist flagging. When the delete instruction is received, the provisional entry controller 135 causes the fourth field of the provisional entry to turn on the blacklist flag to identify that the MAC address in the entry has been blacklisted, and the entry is a blacklisted entry. In an embodiment, the blacklisted entry is used similarly to the provisional entry in the source address look-up and destination address look-up, but cannot be automatically upgraded to the learned entry. Then, the process proceeds to S399 and stops.

At S330, the process proceeds differently based on the provisional time for the provisional entry. In an example, when the provisional time for the provisional entry is longer than a threshold, such as a pre-determined time, the process proceeds to S340; otherwise, the process returns to S310.

At S340, the provisional entry is upgraded to a learned entry. In the FIG. 1 example, the provisional entry controller 135 causes the first field (P) of the provisional entry to be changed to "0" which indicates that the entry is now a learned entry. Thus, when the switch device 110 receives subsequent packets with destination address matching the MAC address in the learned entry, the packets are forwarded via the port in association with the MAC address in the learned entry. Then, the process proceeds to S399 and stops.

It is noted that the process 300 can be suitably modified. In an example, at S330, the process waits for a time duration, and then returns to S310. In another example, the process is suitably modified to operate on a plurality of provisional entries.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
a plurality of ports configured to receive packets from a network and to transmit packets to the network; and
at least one packet processor, separate from a central processing unit (CPU), configured to forward a received packet based on a look-up of a destination address of the received packet in a table of learned entries that associate first addresses checked by the CPU to the ports of the network device, to add a new provisional entry that associates a source address with an ingress port of the received packet based on a look-up of the source address in both the learned entries and provisional entries that associate second addresses to be checked by the CPU to the ports of the network device, and to upgrade the new provisional entry to a learned entry with a delay time to allow the CPU to check the source address.

2. The network device of claim 1, wherein the learned entries and the provisional entries are entries in a forwarding database.

3. The network device of claim 1, wherein the packet processor is configured to broadcast the received packet when the look-up of the destination address in the learned entries fails to find a match.

4. The network device of claim 2, wherein the packet processor is configured to add the new provisional entry in the forwarding database when the look-up of the source address fails to find a match in the first addresses and the second addresses.

5. The network device of claim 4, wherein the packet processor sends a notification of the source address to the CPU to let the CPU check the source address for security control.

6. The network device of claim 2, wherein the CPU is configured to cause the provisional entry to be deleted from the forwarding database when the CPU determines that the source address is prevented from being included among the learned entries.

7. The network device of claim 1, wherein the packet processor is configured to forward the received packet via an egress port associated with the destination address of the received packet, when the destination address corresponds to a learned entry.

8. The network device of claim 1, wherein the packet processor is configured to add the new provisional entry that associates a media access control (MAC) address in a source field of the received packet in association with the ingress port of the received packet when the look-up of the MAC address fails to find a match in both the learned entries and the provisional entries.

9. The network device of claim 8, wherein the packet processor is configured to broadcast to all ports except the ingress ports of received packets having the MAC address in a destination field of the packets before the new provisional entry is automatically converted to a learned entry.

10. The network device of claim 8, wherein, once the new provisional entry is upgraded to a learned entry, the packet processor is configured to forward subsequently received packets having the MAC address in a destination field of the packets via the port associated with the MAC address in the learned entry.

11. A method, comprising:
  receiving, by a packet processor separate from a central processing unit (CPU), a packet from a port among a plurality of ports;
  forwarding the received packet based on a look-up of a destination address of the received packet in a table of learned entries that associate first addresses to the ports of the network device, the first addresses being checked by the CPU;
  adding a new provisional entry that associates a source address of the packet with the port based on a lookup of the source address in the first addresses of the learned entries and second addresses of provisional entries to be checked by the CPU; and
  upgrading the new provisional entry to a learned entry with a delay time to allow the CPU to check the source address.

12. The method of claim 11, wherein the learned entries and the provisional entries are entries in a forwarding database.

13. The method of claim 11, further comprising:
  broadcasting the received packet when the look-up of the destination address in the learned entries fails to find a match.

14. The method of claim 11, wherein adding the new provisional entry further comprising:
  adding the new provisional entry that associates the source address of the packet with the port when the lookup of the source address fails to find a match in the first addresses and the second addresses.

15. The method of claim 11, further comprising:
  sending a notification of the source address to the CPU to let the CPU to check the source address for security control.

16. The method of claim 12, further comprising:
  deleting the new provisional entry from the forwarding database when the source address is prevented from being included among the learned entries.

17. The method of claim 11, further comprising:
  forwarding the received packet via a port associated with the destination address of the received packet when the destination address corresponds to a learned entry.

18. The method of claim 11, wherein adding the new provisional entry further comprising:
  adding the new provisional entry that associates a media access control (MAC) address in a source field of the received packet with the port when the look-up of the MAC address fails to find a match in both the first addresses and the second addresses.

19. The method of claim 18, further comprising:
  broadcasting to all ports except the ingress ports of subsequently received packets having the MAC address in a destination field of the received packets before the new provisional entry is automatically converted to a learned entry.

20. The method of claim 18, further comprising:
  forwarding, once the new provisional entry is upgraded to a learned entry, subsequently received packets with the MAC address in a destination field of the packets via the port associated with the MAC address in the learned entry.

* * * * *